(12) United States Patent
Rung et al.

(10) Patent No.: US 11,582,421 B2
(45) Date of Patent: Feb. 14, 2023

(54) ONLINE CONFERENCE SYSTEM WITH REAL-TIME DOCUMENT TRANSACTION PLATFORM

(71) Applicant: Liveoak Technologies, Inc., San Francisco, CA (US)

(72) Inventors: Peter Rung, Austin, TX (US); Andrew Ambrose, Austin, TX (US); Thomas Brown, Austin, TX (US)

(73) Assignee: LiveOak Technologies, Inc., Austin, TX (US)

(*) Notice: Subject to any disclaimer, the term of this patent is extended or adjusted under 35 U.S.C. 154(b) by 0 days.

(21) Appl. No.: 17/035,027

(22) Filed: Sep. 28, 2020

(65) Prior Publication Data

US 2021/0014454 A1  Jan. 14, 2021

Related U.S. Application Data

(63) Continuation of application No. 15/717,711, filed on Sep. 27, 2017, now Pat. No. 10,812,758, which is a
(Continued)

(51) Int. Cl.
*H04N 7/15* (2006.01)
*G06Q 30/02* (2012.01)
(Continued)

(52) U.S. Cl.
CPC ........... *H04N 7/15* (2013.01); *G06Q 30/0281* (2013.01); *H04L 12/1813* (2013.01);
(Continued)

(58) Field of Classification Search
CPC ............ G06Q 30/0281; H04L 12/1813; H04L 12/1822; H04L 12/1827; H04L 65/4023;
(Continued)

(56) References Cited

U.S. PATENT DOCUMENTS 8,527,591 B2  9/2013  Pirnazar
9,171,087 B2  10/2015  Pirnazar
(Continued)

OTHER PUBLICATIONS

United States Office Action, U.S. Appl. No. 15/717,711, filed Dec. 28, 2018, twenty-seven pages.
(Continued)

*Primary Examiner* — Hemant S Patel
(74) *Attorney, Agent, or Firm* — Fenwick & West LLP

(57) ABSTRACT

A computer-implemented online conferencing transactional platform system comprising an interaction module, a video-conferencing module, and a storage device may allow multiple participants in a video-conference to access, co-browse, collaboratively edit, and sign a transactional document. An interaction module fetches an image of a transactional document and a field identifier for an interactive transactional document element to be filled out from a remotely-connected secure signature API, and displays the image of the document, along with the interactive transactional document element on a webpage interface to a moderator and a signer end user in a video-conference. The interaction module receives a filled-out transactional document in an I-frame from the secure signature API, allowing the signer end user to sign the transactional document using a secure embedded signature process.

20 Claims, 12 Drawing Sheets

Related U.S. Application Data continuation of application No. 14/830,592, filed on Aug. 19, 2015, now Pat. No. 9,813,670.

(60) Provisional application No. 62/039,843, filed on Aug. 20, 2014.

(51) Int. Cl.

| | | |
|---|---|---|
| *H04L 12/18* | (2006.01) | |
| *H04L 65/403* | (2022.01) | |
| *H04L 65/402* | (2022.01) | |
| *H04M 3/56* | (2006.01) | |
| *H04M 7/00* | (2006.01) | |

(52) U.S. Cl.
CPC ...... *H04L 12/1822* (2013.01); *H04L 12/1827* (2013.01); *H04L 65/403* (2013.01); *H04L 65/4025* (2022.05); *H04M 3/567* (2013.01); *H04M 7/0027* (2013.01)

(58) Field of Classification Search
CPC .............. H04L 65/403; H04L 65/4025; H04M 3/56–569; H04M 7/0027; H04M 3/567; H04M 2203/50–509; H04N 7/15; H04N 7/0027
USPC .... 348/14.01–14.16; 379/21.1, 202.1–207.1, 379/265.1–266.1, 201.01, 202.01–27.7; 709/201–207, 217–248
See application file for complete search history.

(56) References Cited

U.S. PATENT DOCUMENTS

| | | | |
|---|---|---|---|
| 9,185,145 B2 | 11/2015 | Pirnazar | |
| 9,483,448 B2 | 11/2016 | Pirnazar | |
| 9,489,353 B2 | 11/2016 | Pirnazar | |
| 9,495,081 B2 | 11/2016 | Paniagua et al. | |
| 9,519,886 B2 | 12/2016 | Berger et al. | |
| 9,813,670 B2* | 11/2017 | Rung ................ | H04M 7/0027 |
| 10,089,286 B2 | 10/2018 | Jemiolo et al. | |
| 10,127,524 B2 | 11/2018 | Burtner et al. | |
| 10,812,758 B2* | 10/2020 | Rung ................ | H04M 7/0027 |
| 2004/0236830 A1* | 11/2004 | Nelson .............. | H04L 65/1006 709/204 |
| 2005/0076215 A1* | 4/2005 | Dryer ................ | G06F 21/64 713/170 |
| 2008/0209516 A1 | 8/2008 | Nassiri | |
| 2009/0025087 A1* | 1/2009 | Peirson, Jr. ........ | G06Q 10/00 726/27 |
| 2011/0271332 A1 | 11/2011 | Jones et al. | |
| 2011/0276875 A1* | 11/2011 | McCabe ............ | G06F 40/197 715/255 |
| 2012/0036081 A1 | 2/2012 | Hatter et al. | |
| 2012/0089659 A1 | 4/2012 | Halevi et al. | |
| 2013/0169733 A1 | 7/2013 | Jang et al. | |
| 2014/0115713 A1 | 4/2014 | Picazo | |
| 2014/0189495 A1* | 7/2014 | Jiang ................. | H04L 67/02 715/234 |
| 2015/0067347 A1 | 3/2015 | Dease et al. | |
| 2015/0178252 A1 | 6/2015 | Dunn et al. | |
| 2015/0339280 A1* | 11/2015 | McLaughlin ...... | G06F 21/32 726/16 |
| 2016/0012556 A1* | 1/2016 | Moore ............... | G06Q 10/10 705/311 |
| 2016/0041954 A1 | 2/2016 | Bloch et al. | |
| 2016/0048696 A1* | 2/2016 | Follis ................ | G06F 21/6209 726/28 |

OTHER PUBLICATIONS

United States Office Action, U.S. Appl. No. 15/717,711, filed Jun. 11, 2019, twenty-nine pages.

\* cited by examiner

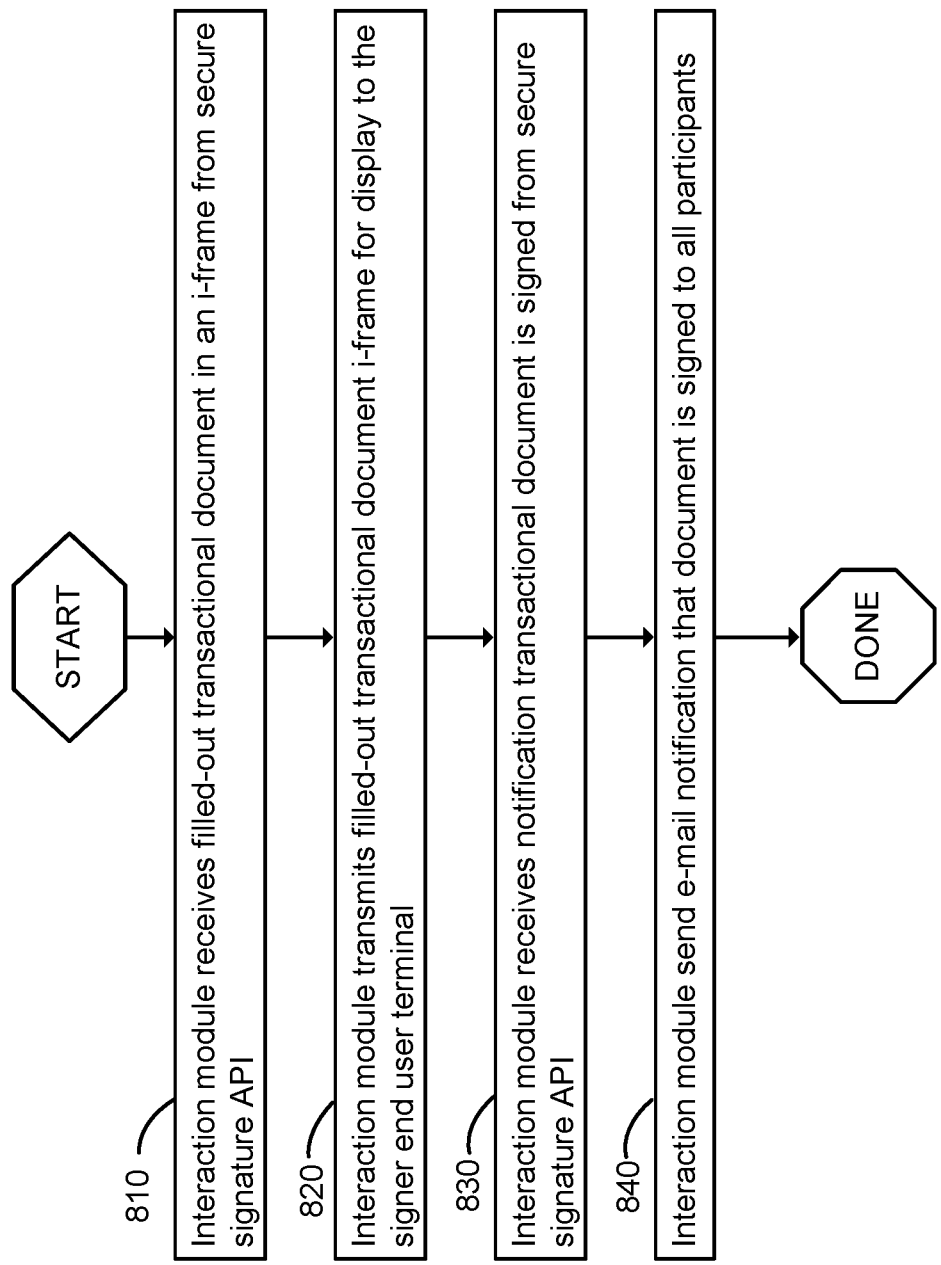

ively focus on specific implementations and embodiments of the teachings.
ONLINE CONFERENCE SYSTEM WITH REAL-TIME DOCUMENT TRANSACTION PLATFORM This application is a continuation of U.S. patent application Ser. No. 15/717,711 filed Sep. 27, 2017, now U.S. Pat. No. 10,812,758, which is a continuation of U.S. patent application Ser. No. 14/830,592, entitled "Online Conference System with Real-Time Document Transaction Platform," filed on Aug. 19, 2015, now bearing U.S. Pat. No. 9,813,670, which claims priority to U.S. Provisional Patent Application No. 62/039,843, entitled "Online Conference System with Real-Time Document Transaction Platform," filed on Aug. 20, 2014, all of which are hereby expressly incorporated by reference in their entirety.

FIELD OF THE DISCLOSURE

The present disclosure generally relates to document co-browsing platforms on computing systems. In another aspect, the present disclosure relates to online conferencing systems.

BACKGROUND

Many transactional meetings require face-to-face meetings to explain documents and to verify the authenticity of participants and the authenticity of signatures. Some in-person meetings need interaction with documents being discussed. Many individuals now prefer to meet online via remote computer workstations rather than travel for in person meetings. However, conventional online conferencing tools typically only allow one side of the conference, for example, the host, to edit or add material to a document being displayed.

There is an increasing need for online conferencing to handle document review by remote parties. For example, many consumers are turning to online services to enter into contracts. Some complex transactions may require multiple steps and a detailed explanation from a representative. In some cases, the consumer may be required to initial or sign off on portions of documents acknowledging they understand the terms. Usually, signatures are obtained offline leaving review and understanding of the terms at the consumers' discretion. However, a large percentage of customers abort due to transactional friction and behavioral inertia when the documentation is not explained to them.

In some platforms, the consumer may be required to leave an audio or video conversation to retrieve a document sent via an email to complete the transaction. Moreover, there are little safeguards in place to verify the authenticity of the consumer and signature since the transaction is typically consummated offline and out of the presence of a live witness. Embodiments of the computer-implemented online conferencing transactional platform system described herein solve this problem. Current computer-based secure signature systems and services online do not provide for any collaborative review of transactional documentation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 8 is a flow diagram of a method for secure signing a transactional document using a computer-implemented online conferencing transaction platform system according to an embodiment of the present disclosure.

The use of the same reference symbols in different drawings may indicate similar or identical items.

DETAILED DESCRIPTION OF THE DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications.

An online conferencing system may provide a platform for real-time document co-browsing and transactional execution that includes entry of information into the document. However, this generally only applies to documents stored within the online conferencing system that hosts the video conference, and only one of the participants may edit the document. This is true because web application security standards currently allow a first web page to access data in a second web page, but only if both web pages have the same origin. An origin is a combination of a URI scheme, a hostname, and port number. This concept is called the same-origin policy. This policy prevents a malicious script on one page from obtaining access to sensitive data on another web page through that page's document object model. When applied to video-conferencing, this means the participants to the video-conference may only simultaneously browse or view items, programs, or documents hosted by the API or program that runs the video-conference. Items, programs, or documents that are hosted by APis with different URI schema, hostnames, or port numbers cannot be accessed or co-browsed by the video-conference participants.

The computer implemented online conferencing transactional platform system herein described may overcome this same-origin policy, allowing the system to access documents stored on a separate API with a different origin, and to display the document for co-browsing between multiple participants in a video conference. For example, a transactional document in the present disclosure may be fetched from a secure signature online system API, or an e-notary system, and active fields separately determined from the secure signature API. Further, the computer implemented online conferencing transactional platform system herein described may also allow a moderator to control the browsing of the document, while simultaneously allowing at least one other participant to enter information needed to fill out the document. This allows two or more participants to review a transactional document, discuss its contents, and fill-in any necessary fields within the document, significantly decreasing the likelihood of miscommunication and misunderstanding between the parties, or the inadvertent input of erroneous information.

Figure 1:
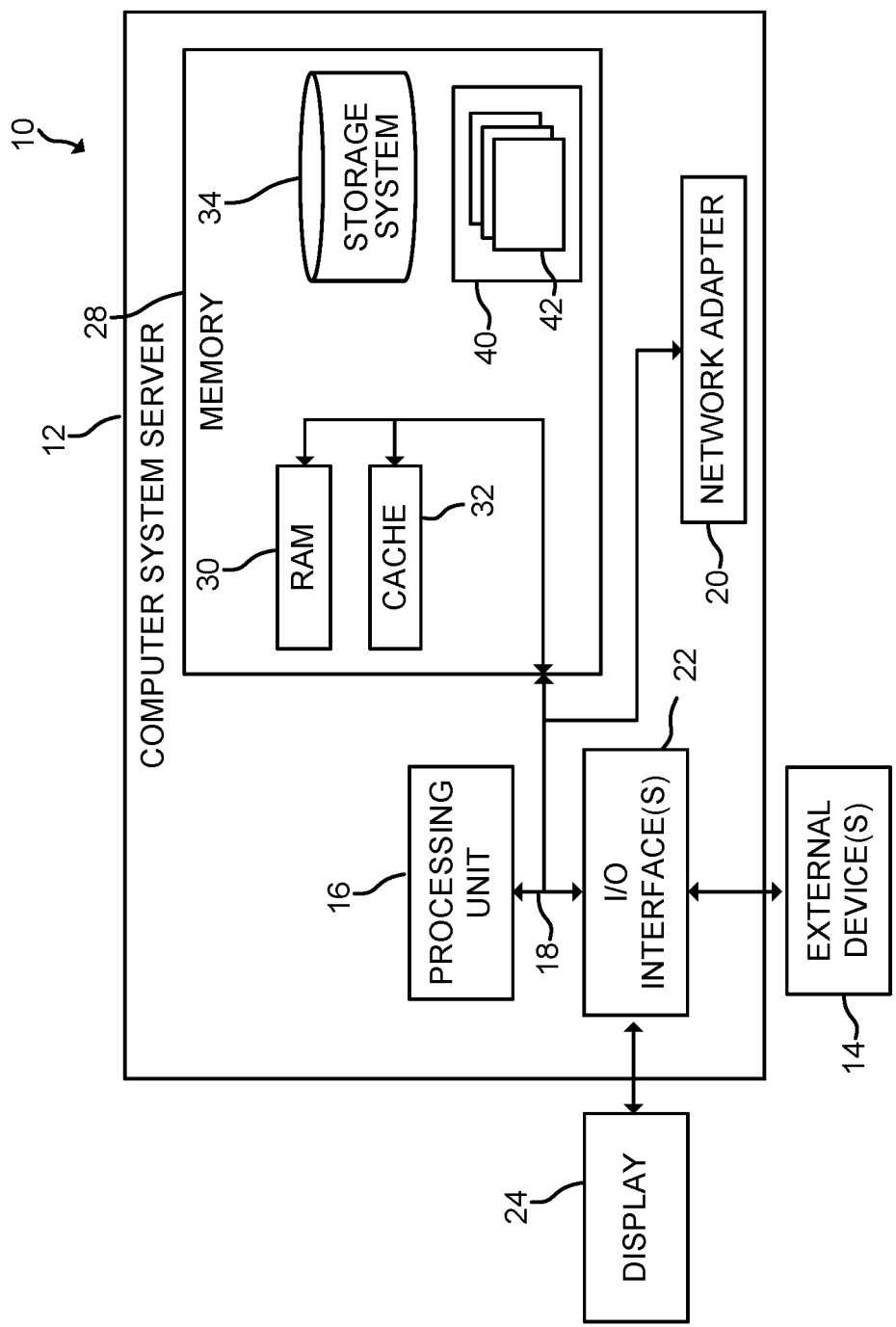
FIG. 1 is a schematic of an example of a computer system/server according to an embodiment of the present disclosure.

Now referring to FIG. 1, a schematic of an example of a computer system/server 10 is shown according to one or more embodiments of the present disclosure. In an embodiment, the computer system/server 10 is shown in the form of a general-purpose computing device. The components of the computer system/server 10 may include, but are not limited to, one or more processors or processing units 16, a system memory 28, and a bus 18 that couples various system components including the system memory 28 to the processor 16.

In some embodiments, the computer system/server 10 may be a cloud computing node connected to a cloud computing network (not shown). The computer system/server 10 may be, for example, personal computer systems, tablet devices, mobile telephone devices, server computer systems, handheld or laptop devices, multiprocessor systems, microprocessor-based systems, set top boxes, programmable consumer electronics, network PCs and distributed cloud computing environments that include any of the above systems or devices, and the like. The computer system/server 10 may be described in the general context of computer system executable instructions, such as program modules, being executed by a computer system (described for example, below). The computer system/server 10 may be practiced in distributed cloud computing environments where tasks are performed by remote processing devices that are linked through a communications network. In a distributed cloud computing environment, program modules may be located in both local and remote computer system storage media including memory storage devices.

In an embodiment, the computer system/server 10 may typically include a variety of computer system readable media. Such media could be chosen from any available media that is accessible computer system/server 10, including non-transitory, volatile and non-volatile media, removable and non-removable media. The system memory 28 could include one or more computer system readable media in the form of volatile memory, such as a random access memory (RAM) 30 and/or a cache memory. By way of example only, a storage system 34 can be provided within system memory 28 for reading from and writing to a storage memory such as a static drive implementing NOR flash, NAND flash or the like or a non-removable, non-volatile magnetic media device typically called a "hard drive" (not shown). The system memory 28, may include at least one computer-implemented online conferencing transactional platform 40 having a set (e.g. at least one) of program modules 42 that are configured to carry out the function of embodiments. The platform 40 having a set (at least one) of program modules 42 may be stored in the system memory 28 by way of example, and not limitation, as well as an operating system, one or more application programs, other program modules 42, and program data. Each of the platform, operating system, one or more application programs, other program modules, and program data or some combination thereof, may include an implementation of a networking environment. The program modules 42 generally carry out the functions and/or methodologies of embodiments as described herein.

The computer system/server 10 may also communicate with one or more external devices 14 such as a keyboard, a pointing device, a display 24, etc., and/or any devices (e.g., network card, modem, etc.) that enable the computer system/server to communicate with one or more other computing devices. Such communication can occur via Input/Output (1/0) interfaces 22. Alternatively, the computer system/server 10 can communicate with one or more networks such as a local area network (LAN), a general wide area network (WAN), and/or a public network (e.g., the internet) via a network adapter 22. As depicted, the network 20 adapter may communicate with the other components of the computer system/server 10 via the bus 18.

As will be appreciated by one skilled in the art, aspects of the disclosed invention may be embodied as a system, method, or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed embodiments may take the form of a computer program product embodied in one or more computer readable media having computer readable program code embodied thereon.

Any combination of one or more computer readable media (for example, main memory RAM 30, static memory 34, or other computer readable medium such as cache 32) may be utilized. In the context of this disclosure, a computer readable storage medium may be any tangible or non-transitory medium that can contain, or store a program (for example, the instructions 40) for use by or in connection with an instruction execution system, apparatus, or device. A computer readable storage medium may be, for example, but not limited to, an electronic, magnetic, optical, electromagnetic, infrared, semiconductor, organic, or quantum system, apparatus, or device, or any suitable combination of the foregoing. One or more of the above-described computer system/servers 10 may serve as one or more components to perform various embodiments herein including hosting the online conferencing transactional platform, as a signer end user terminal, a moderator terminal, or a server or servers supporting an online secure signature system and APL Aspects of the disclosed embodiments are described below with reference to flow diagrams and/or block diagrams of methods, apparatus (systems) and computer program products. It will be understood that each block of the flow diagrams and/or block diagrams, and combinations of blocks in the flow diagrams and/or block diagrams, can be implemented by the platform. The computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flow diagrams and/or block diagram block or blocks. The instructions can be stored in a computer readable medium. One such set of instructions includes an operating system with operating system interface. Example operating systems can include those used with typical mobile computing devices such as Windows Phone mobile OS from Microsoft Corporation and Android OS from Google Inc., for example Key Lime Pie v. 5.x. Additional sets of instructions in the form of multiple software applications may be run by system 10. These software applications may enable multiple uses of the computer-implemented online conferencing transactional platform system as set forth below in more detail.

Figure 2:
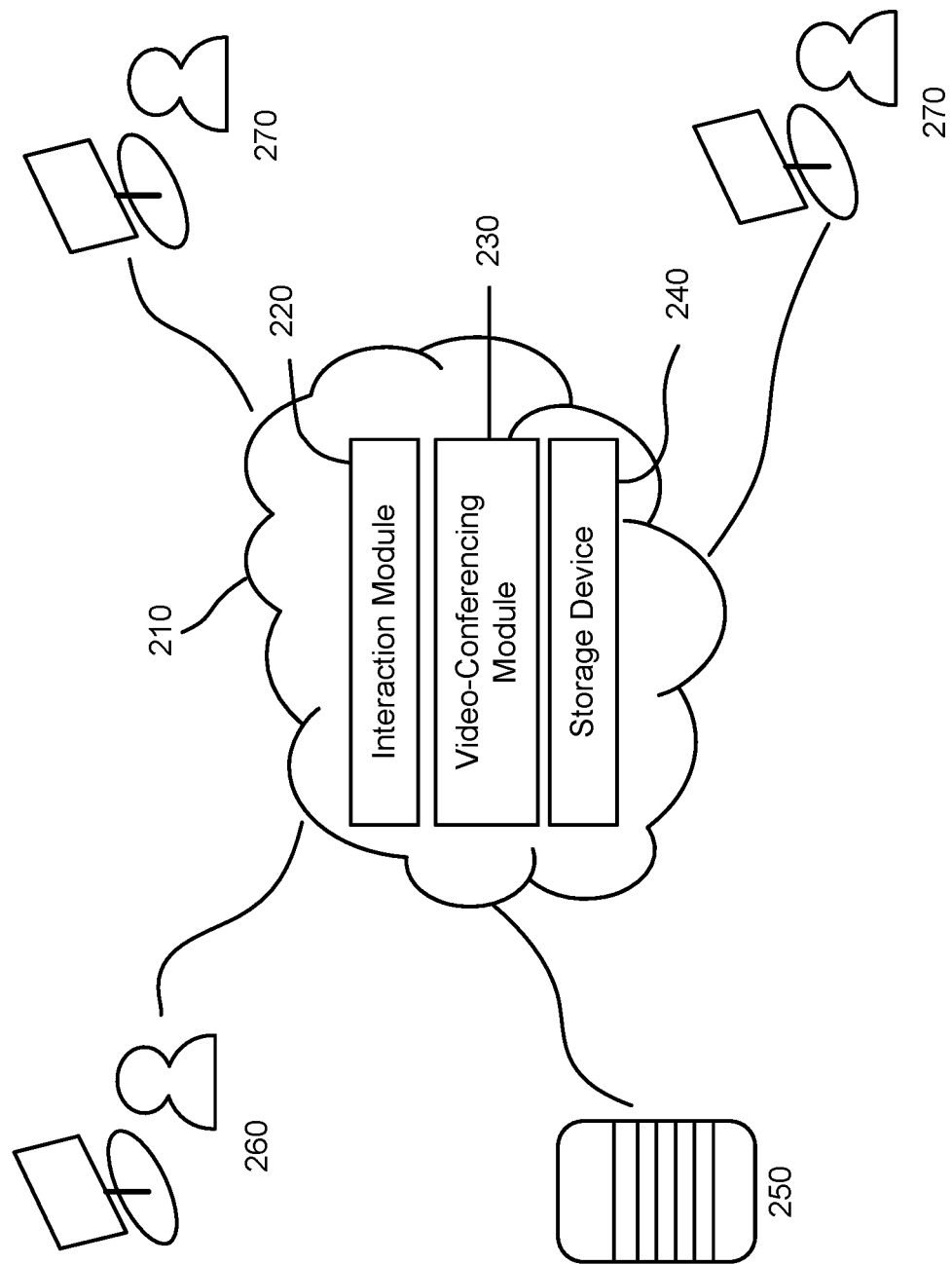
FIG. 2 is a schematic of an example online conferencing transactional platform connected via a network to a secure signature API, a moderator terminal, and at least one signer end user terminal according to an embodiment of the present disclosure.

FIG. 2 shows a schematic of an example online conferencing transactional platform connected via a network to a secure signature API, a moderator terminal, and at least one signer end user terminal according to an embodiment of the present disclosure. In an embodiment, the online conferencing transactional platform 210 may contain an interaction module 220, a video-conferencing module 230, and a storage device 240. The secure signature system 250 may contain transactional documents to be filled out and/or signed by one or more parties in collaboration with other parties. The online conferencing transactional platform 210 is connected to the secure signature system with secure signature application programming interface (API) 250, a moderator terminal 260, and at least one signer end user terminal 270 via a network connection, such as a local area network (LAN), a general wide area network (WAN), and/or a public network (e.g., the internet). The online conferencing transaction platform 210 is connected to the signer end user terminal via an internet network connection using html protocol. In an embodiment, this connection is a secure internet connection utilizing encryption, password access, or other security measures understood in the art. The interaction module 220, video-conferencing module 230, and storage device 240 function together to allow sharing, co-browsing, entry of information into, and signing of transactional documents between the moderator terminal and at least one signer end user terminal in several embodiments as described further herein.

Figure 3:
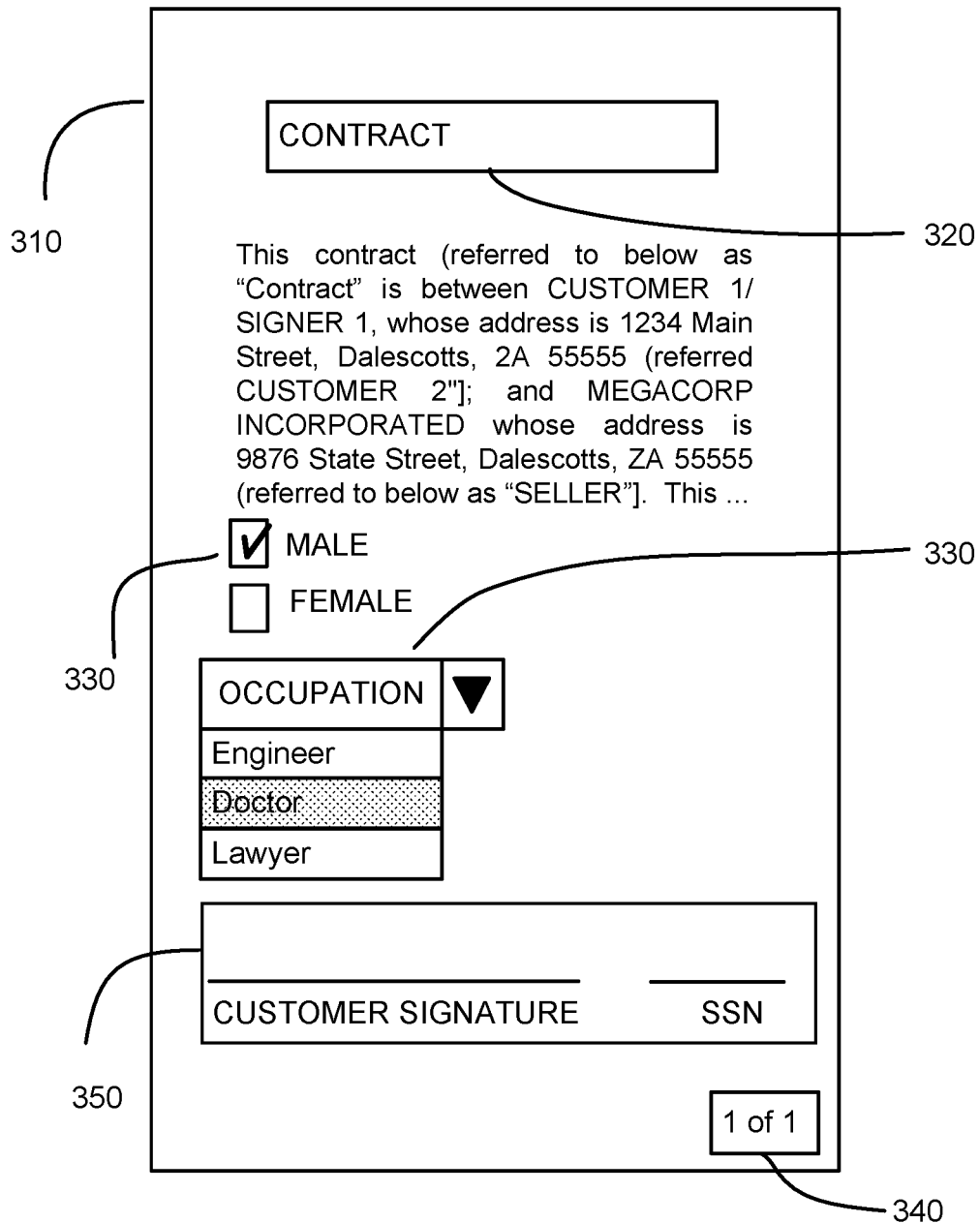
FIG. 3 is a diagram of a transactional document within a secure signature system to be filled out and signed by multiple parties according to an embodiment of the present disclosure.

FIG. 3 shows an example of a transactional document within the secure signature system 250, to be filled out and signed by multiple parties. In an embodiment, the transactional document contains several field element identifiers, which may include, for example, a document identifier 310, a title identifier 320, a document element 330, a page number 340, or a signature field 350. A transactional document element may include, for example, a pull-down menu, a choice of check boxes, radio buttons, or a text field, some of which are shown in FIG. 3. The transactional document, images of the transaction document, and associated field element identifiers are stored on the secure signature API system 250 for editing and signing. However, the secure signature system 250 and accessible via a secure signature system API therein that only allows one user at a time to view or edit transactional documents stored on it. There exists a need to allow multiple parties to co-browse these transactional documents, collaboratively fill in the fields, and sign the transactional documents. An example secure signature system 250 may include an e-notary ore-signature online service such as DocuSign® or other similar secure signature systems.

Figure 4:
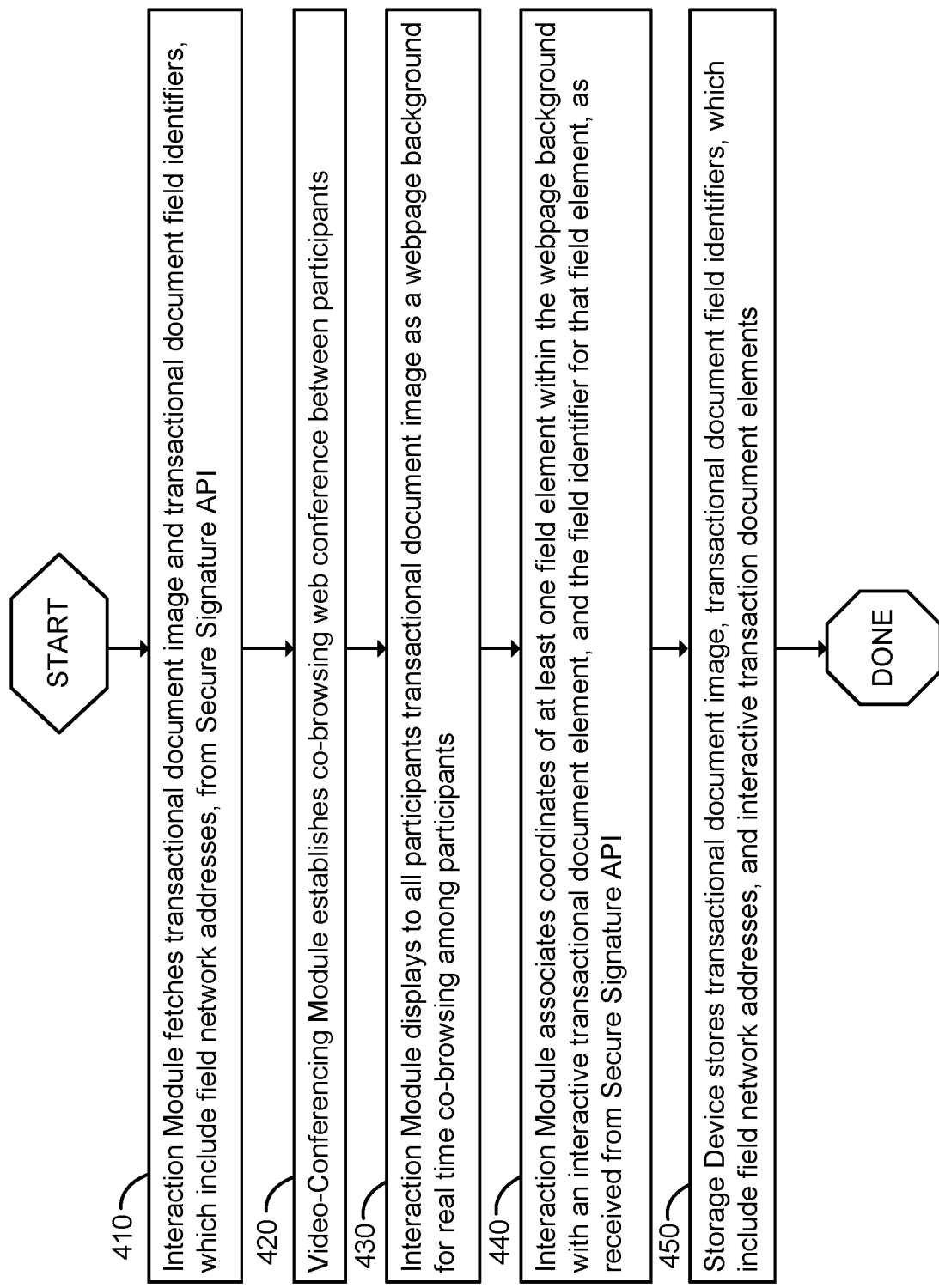
FIG. 4 is a flow diagram of a method for moving a transactional document stored in a secure signature API to a computer-implemented online conferencing transactional platform according to an embodiment of the present disclosure.
Figure 5A:
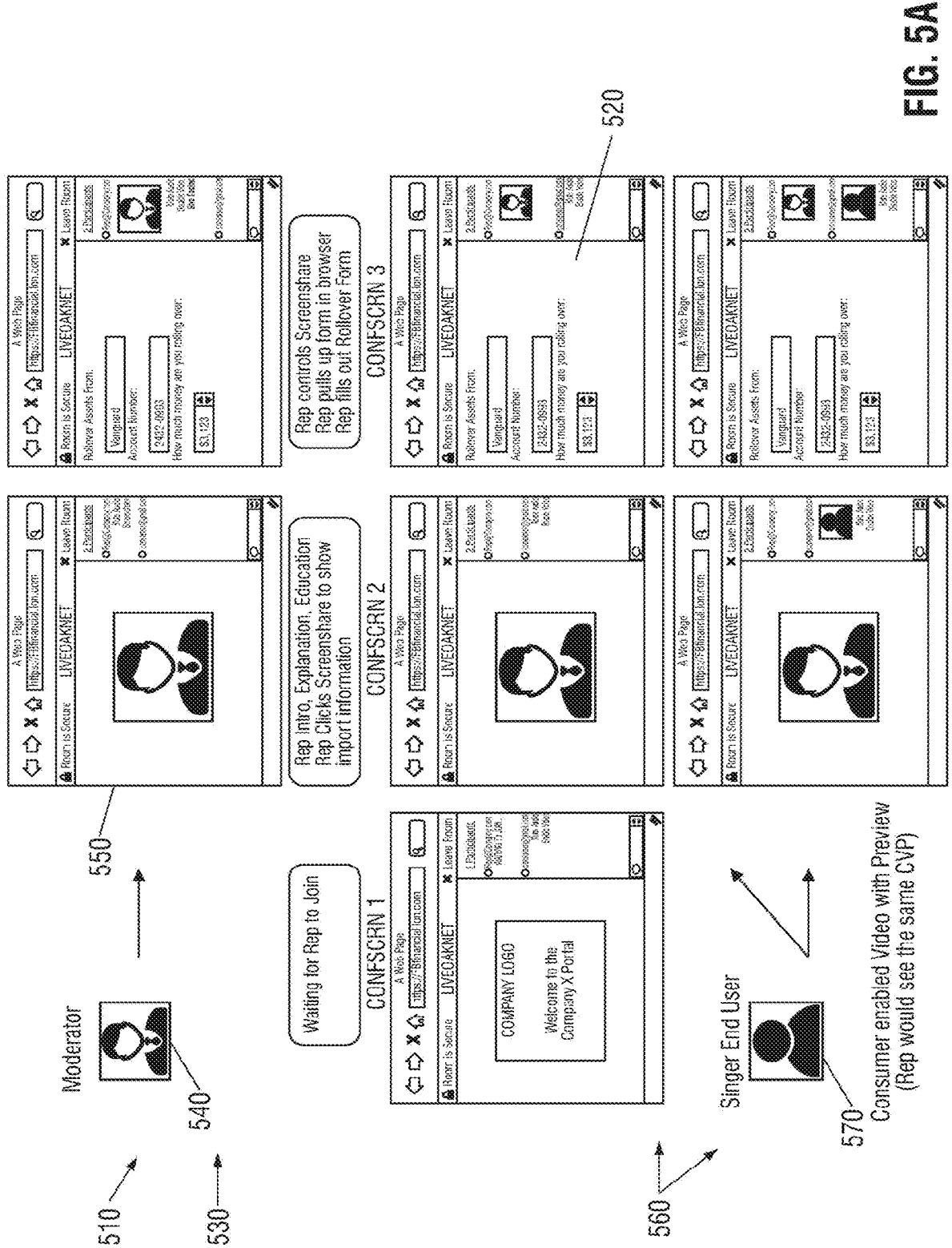
FIGS. 5A, SB, and SC are diagrams illustrating an online conference in sequence from left to right according to an embodiment of the present disclosure.
Figure 5B:
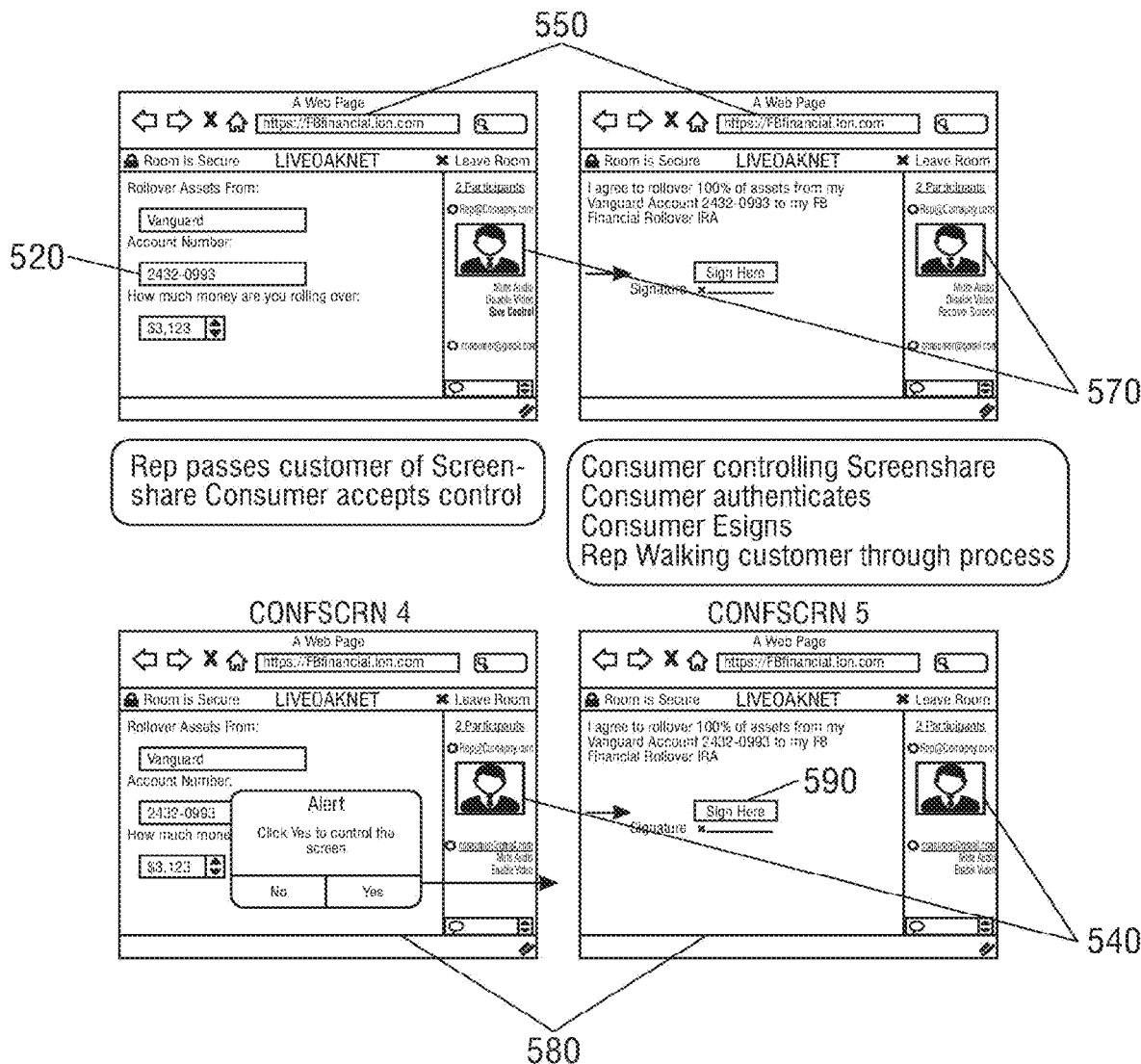
Figure 5C:
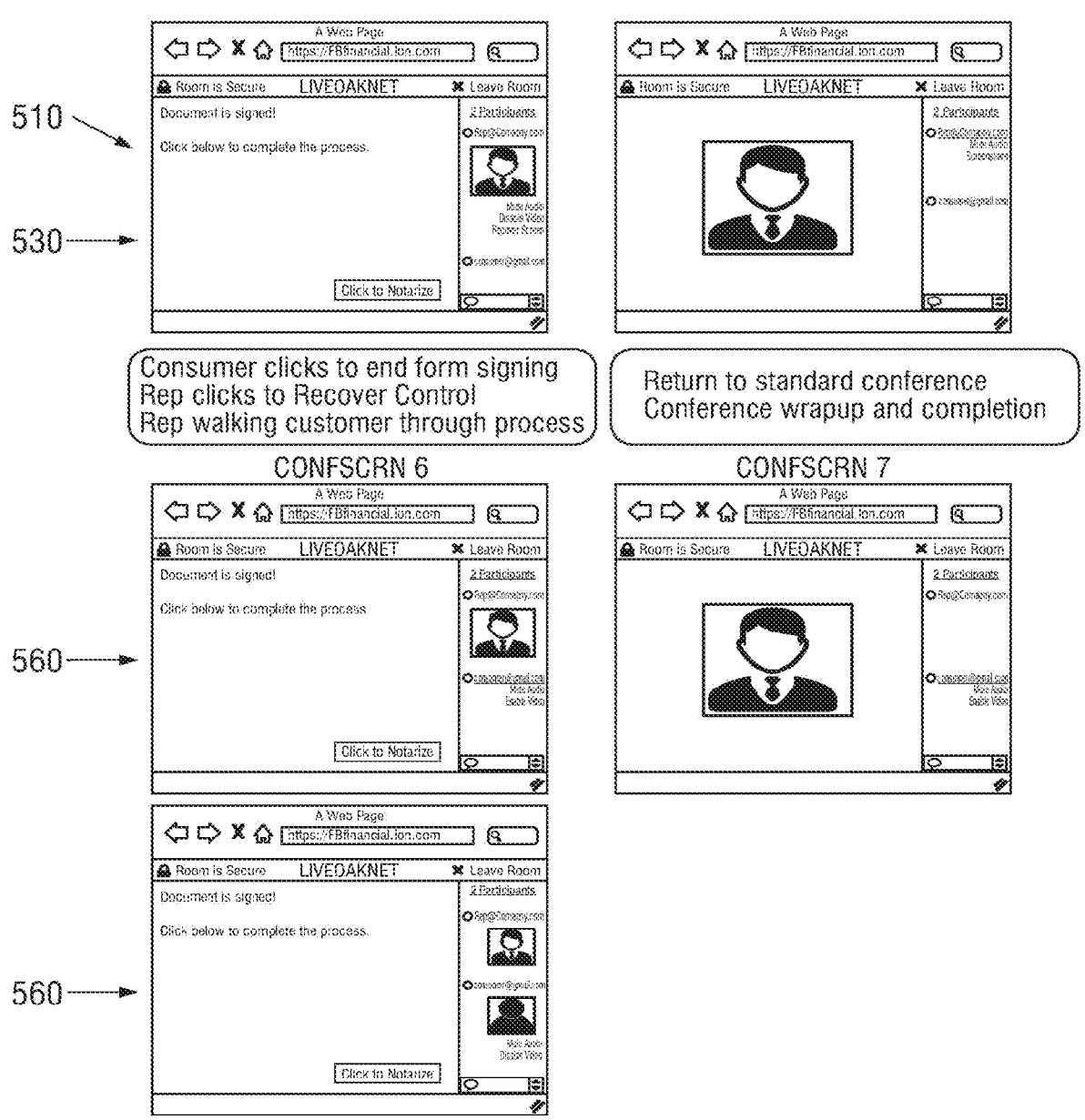

FIG. 4 shows a flow diagram of a method for co-browsing a transactional document stored in the secure signature system 250 via the computer-implemented online conferencing transactional platform 210 in an example aspect. For example, the method of FIG. 4 may allow multiple parties to co-browse the transactional documents, collaboratively fill in the fields, and sign the transactional document. In an embodiment, at block 410, the interaction module 220 may fetch an image of pages of a transaction document and transactional document field identifiers 310-350 associated with the transactional document from the secure signature API 250 through API calls. The document field identifiers 310-350 may further include field network addresses of the field elements as stored within the secure signature system 250. These may include associated identifiers such as document identification codes, page identifier codes, and identifier field codes for each transactional document element. Each transactional document element may also have associated metadata within the document field identifier information. For example, metadata may include designations such as first name, last name, descriptors (salary, costs, contributions, etc.) or other alphanumeric metadata. For example, the text fields may include type metadata identifying a name field, a social security number field, a date field or similar text fields.

At block 420, the video-conferencing module 230 may establish a network connection between the moderator terminal 260 and at least one signer end user terminal 270 (referred to here as "participants"). At block 430, the interaction module 220 displays to all participants the transactional document image as a webpage background. This allows the participants to co-browse the transactional document together, and discuss its contents to ensure all participants have the same understanding of the transactional document's meaning.

At block 440, the interaction module 220 associates coordinates within the displayed webpage background of at least one field element with its field element identifier and with an interactive transactional document element. In an embodiment, an interactive transactional document element is a data input mechanism displayed on top of the webpage background to the participants as an empty field into which participants may enter data. For example, if the transactional document includes a check box document element 330, the interactive module 220 may display an interactive transactional document element that appears as check boxes similar to those in the transactional document image. This transactional document element may be displayed on top of the transactional document image shown in the webpage background. As a further aspect of the embodiment, this transactional document element may be displayed directly on top of the non-interactive check boxes shown in the transactional document image shown in the webpage background. In one example embodiment, the coordinates of the interactive transactional document element and sizing are matched to align with the underlying transactional document element appearing on the webpage background image of the corresponding page of the transactional document from the secure signature system. In an aspect, this may appear to a participant as if the underlying transactional document image background webpage were interactive itself In order to achieve this, the interaction module 220 may associate the check box document element 330 with a field identifier for that check box document element 330, and associate the coordinates on the webpage background of that field identifier as the coordinates on the screen of the interactive transaction document element. In effect, this may allow the interactive transactional document element to lie on top of the non-interactive image of the transactional document displayed as the webpage background, appearing as if the two are part of the same shared transactional document. In other aspects, it is understood that a representation of the interactive transactional document element may be used. In one example embodiment, an intuitive representation of the interactive transactional document element may appear to the participants on the webpage. In another example embodiment, a representation of the interactive transactional document element may appear nearby to the location of the corresponding interactive transactional document element on the webpage background document page image.

At block 450, the storage device accessible by the online conferencing transactional platform stores the coordinates within the displayed webpage background of at least one field element with its field element identifiers, metadata, and with the associated interactive transactional document element.

Referring now to FIGS. SA and SB, an online conference 500 according to an embodiment of the invention is shown in sequence from left to right. In general, embodiments of the online conference 510 may allow for real-time transactions to be performed live by participants of the conference. A shared transaction document 520 may be shared and control of the shared transactional document 520 may be shared so that participants may modify, edit, or execute a transactional document. Row 530 represents the moderator terminal 260 side of the online conference 510. A moderator 540 may be for example, a company representative. The moderator 540 may interact with screen 550. For sake of illustration, screen 550 is only numbered once however it will be understood that subsequent screens 550 will be referred to as the screen 550 changes. Row 560 represents the signer end user terminal 270 side of the online conference. A signer end user 570 may be, for example, a consumer. The signer end user 570 may interact with screen 580. For sake of illustration, screen 580 is only numbered once, however it will be understood that subsequent screens 580 will be referred to as the screen 580 changes. The screens 550 and 580 may be enabled with audio/video plus screen-sharing and co-browsing capabilities to provide video conferencing. The screens 550 and 580 may display the same shared transactional document 520 but from the perspective of the moderator 540 and the signer end user 580 respectively. The moderator 540 may guide the signer end user 570 through a series of screens 580 providing information and/or document(s). As illustrated for example, the moderator 540 is advising the signer end user 570 on rolling over a retirement account and the signer end user 570 is reviewing the requirements and options on a shared transaction document 520 related to account transactions. The signer end user 570 may validate and question the shared transaction document 520 in real time. The signer end user 570 is able, through the online conference 510, to invoke, for example, a financial transaction while being educated and guided by the moderator 540. The moderator 540 may at any point, advise the signer end user 570 on how to perform the transaction.

In a further aspect of the embodiment, the moderator 540 may control the screen 580 through his own screen 550. Once the signer end user 570 is ready to authorize a transactional event, the moderator 540 may invoke a command to enable the signer end user 570 to accept full control of the screen 580 and securely complete the transaction. A screen interaction module 590 may appear on the screen 580 allowing the signer end user 570 to enter a real-time executed transactional action within the shared transactional document 520. For example, the signer end user 570 may control the screen 580 and may provide signature information 590 within the shared transactional document 520 provided by the moderator 540. Referring now to FIG. SC, execution of the transactional event may release control of the screen 580 back to the moderator 540.

Figure 6:
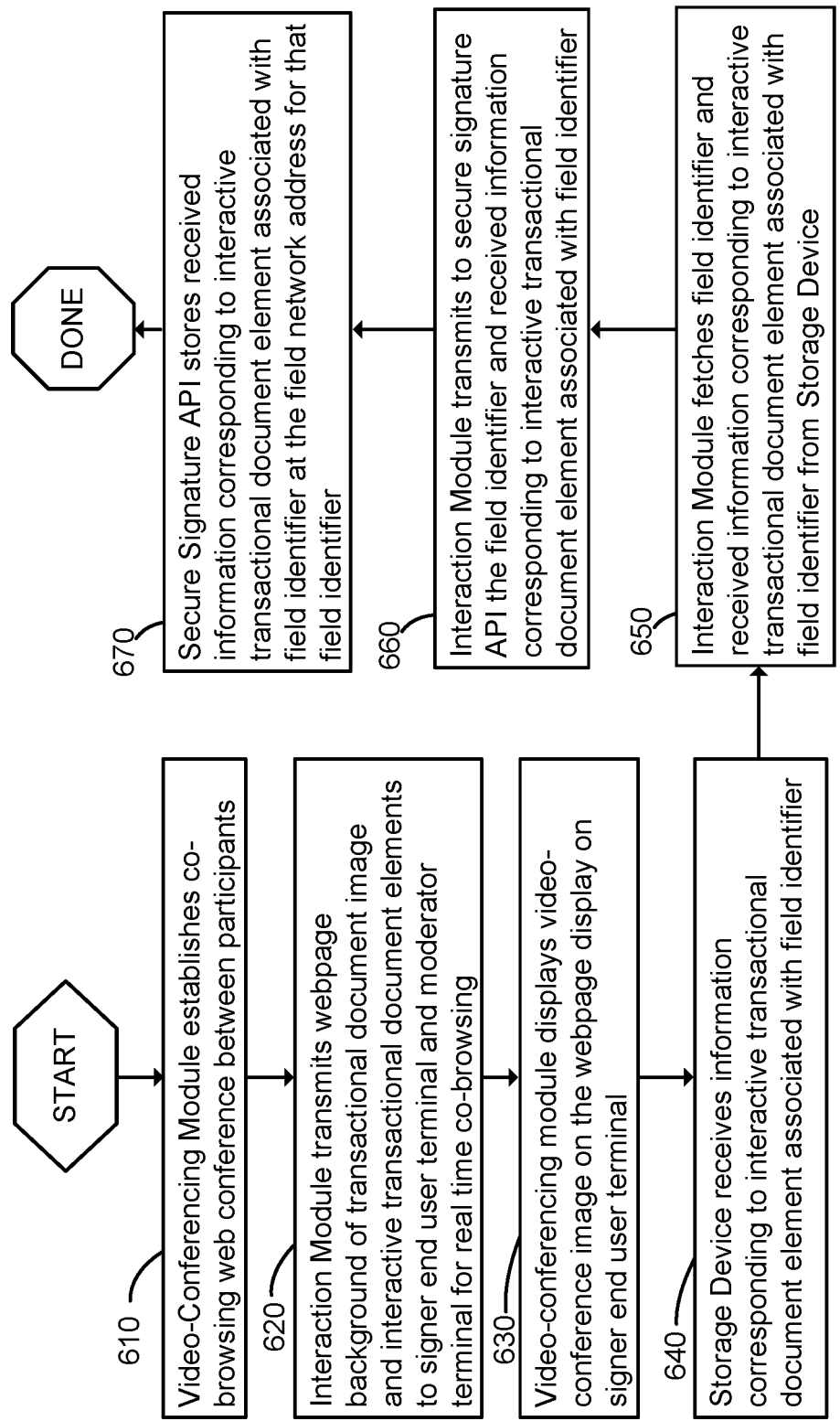
FIG. 6 is a flow diagram of a method for displaying a shared transactional document with multiple conference participants, allowing the participants to co-browse, discuss, and fill-out the shared transactional document according to an embodiment of the present disclosure.

FIG. 6 shows a flow diagram of a method for displaying a shared transactional document 520 with multiple conference participants, allowing the participants to co-browse, discuss, and fill-out the shared transactional document 520. In an embodiment, at block 610, the video-conferencing module may establish a co-browsing web conference between the participants by connecting the computer-implemented online conferencing transaction platform 510, the moderator terminal 560, and the signer end user terminal 270 via an internet network connection. At block 620, the interaction module may transmit the webpage background of the transactional document image and an interactive transactional document element overlying the webpage background or otherwise displayed along with the webpage background image of the transactional document (together referred to as the shared transactional document 520) to signer end user terminal 270 and moderator terminal 260 for real-time browsing. At block 630, the video conferencing module may display at least one video conference image on the webpage display on the signer end user terminal 270. For example, the video conferencing module may display an image of moderator 540 on the signer end user terminal screens 580.

Returning to FIG. 6, at block 640, the storage device 240 may receive information corresponding to at least one interactive transactional document element associated with a field identifier. As an illustration, consider the example discussed above, where a check box transactional document element is displayed directly on top of the non-interactive check boxes in the transactional document image shown in the webpage background, giving the signer end user 570 the impression the check box transactional document element is part of the transactional document image. The signer end user 570 could then click on one of the check boxes within the interactive transactional document element in order to indicate a choice. The storage device 240 would receive this information corresponding to the check box interactive transactional document element and associate that information with the field identifier for the check box transactional document element as it is presented in the original transaction document received from the secure signature system 250.

At blocks 650 and 660, the interaction module 220 may fetch from the storage device 240 and transmit to the secure signature system and API 250 a field identifier and received information corresponding to an interactive transactional document element associated with that field identifier. At block 670, the secure signature system 250 populates fields of the transactional document elements and stores the received information corresponding to the interactive transactional document element associated with the field identifier at the field network address for that field identifier. Continuing the example above, the interaction module 220 may fetch from the storage device 240 and transmit to the secure signature API 250 the information corresponding to the check box interactive transactional document element the associated field identifier for the check box transactional document element as it is presented in the original transaction document received from the secure signature system and API 250. The secure signature system 250 stores the received information corresponding to the check box interactive transactional document element and corresponding to the field identifier for the check box transaction document element at the field network address for that field identifier.

Figure 7A:
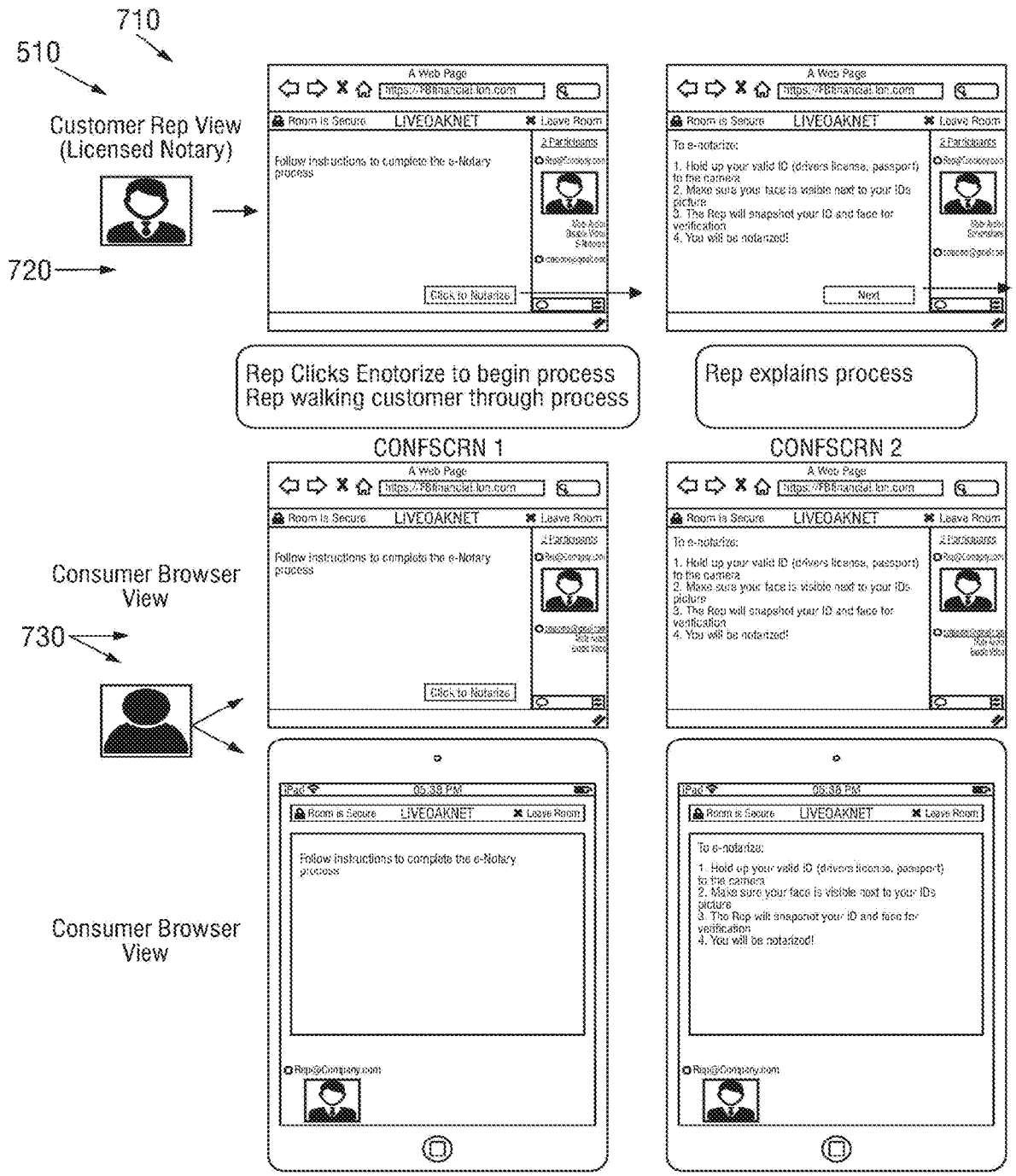
FIGS. 7A and 7B are diagrams illustrating an e-notary session according to an embodiment of the present disclosure.
Figure 7B:
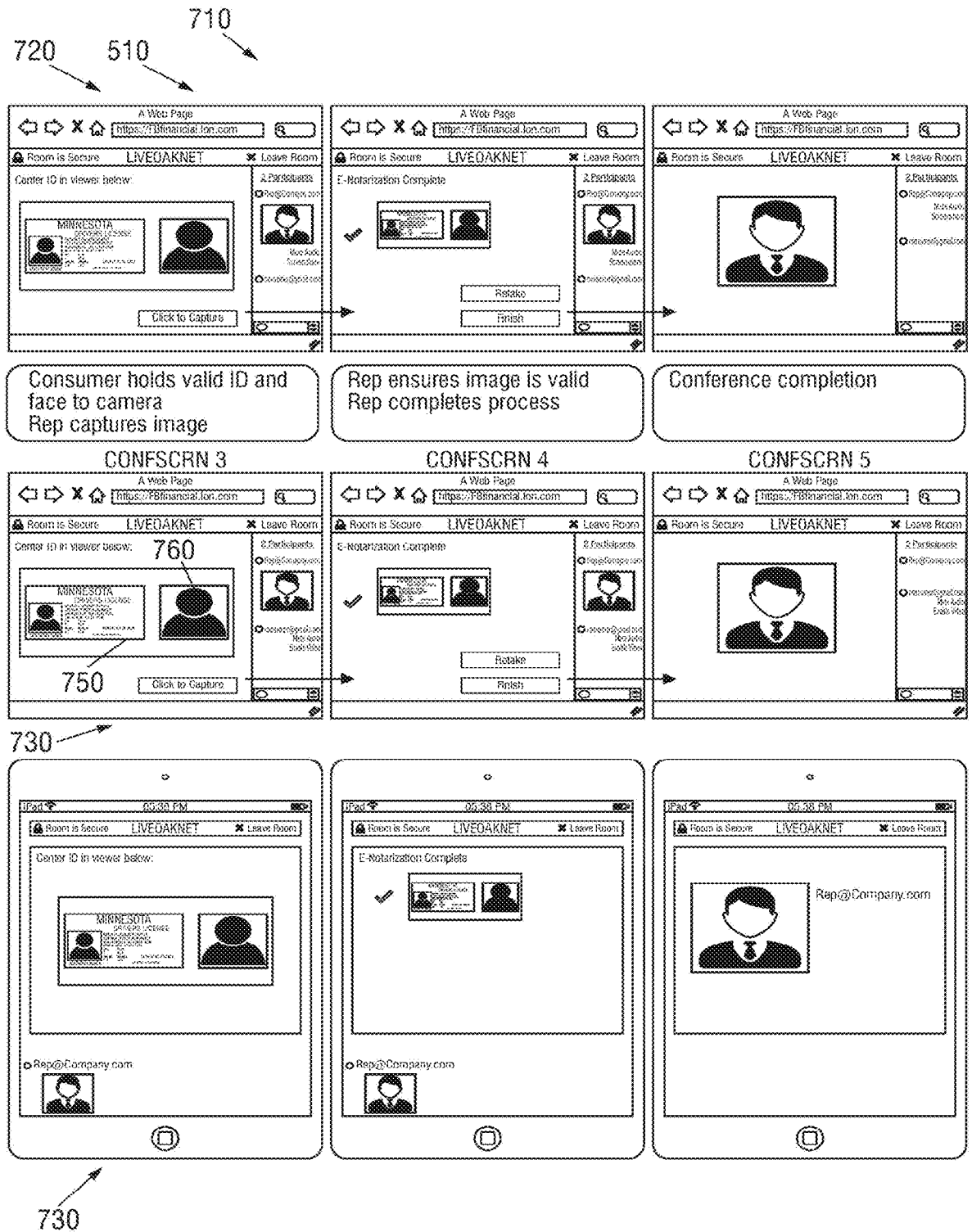

Referring now to FIGS. 7A and 7B, an e-notary session 710 is shown according to an embodiment of the invention. Thee-notary session 710 is another embodiment of how the online conference 510 may be used. Thee-notary session 710 may provide remote signing of documents that need to be notarized via a secure signature system such as 250. Row 720 represents the host terminal side of the session 710. The moderator terminal 260 side may be operated, for example, by a notary. Row 730 represents the signer end user terminal 270 side of the session 710. The end user side may be a consumer who needs to sign documents in the presence of a witness. In some embodiments, the online conference 510 may use a camera 740 from the signer end user 570 side to capture and upload an identifying image 750 or other file to thee-notary session 710. The identifying image 750 may be some item the notary needs to witness live and verify it is being presented by the end user 570. For example, the signer end user 570 may capture the image of his/her driver's license or identification card (identifying image 750) and may present online to the moderator 540 via thee-notary session 710. The host may compare the identifying image 750 to a live image 760 of the signer end user 570 plus identifiable electronic characteristics like device IP or login email for verification of the signer end user's 570 identity and thus, transactional document's authenticity (FIG. 7B).

FIG. 8 represents a flow diagram of a method for secure signing a transactional document using the computer-implemented online conferencing transaction platform system 210. At block 810, the interaction module 220 may receive a filled-out transactional document in an inline frame (I-frame) from the secure signature system via API 250. Frames allow a visual HTML browser window to be split into segments, each of which can show a different document. An I-Frame is an HTML document embedded inside another HTML document on a website. I-Frames are often used to insert content from another source, thus allowing a browser to embed content from a remote origin within content from the local origin without violating the same origin policy described above.

At block 820, the interaction module 220 may transmit the filled-out transactional document I-frame for display to the signer end user terminal 270. In this way, the interaction module 220 allows the signer end user 570 to access the transactional document within the secure sign system 250 itself via the I-frame. The signer end user 570 may then enter signature information, such as an identifying image 740, a social security number, or a tax identification number into the signature field 350 of the transactional document within the secure signature API 250. At block 830, the interaction module 220 may receive notification the transactional document is signed from the secure signature API 250. In a further aspect of the embodiment, at block 840, the interaction module 220 may send an e-mail notification that the transactional document is complete and signed to all participants of the conference. It is understood that in another embodiment requiring signatures of multiple parties, an I-frame of the transactional document may be displayed to the appropriate other party. For example, a moderator may also be a signer on behalf of a seller. An I-frame may be displayed to the moderator signer for execution of a secure signature process in accordance with the secure signature system 250. Similarly, an I-frame may be used with each additional signer party to the transactional document as appropriate. It is further understood that display of the I-frame for execution of the secure signature processes may be limited to display to the individual signer executing that portion of the secure signature process. In other embodiments, some or all parties may utilize a remote secure signature process instead of an embedded signature process such as via an I-frame. This aspect is described further with respect to FIG. 9.

Figure 9:
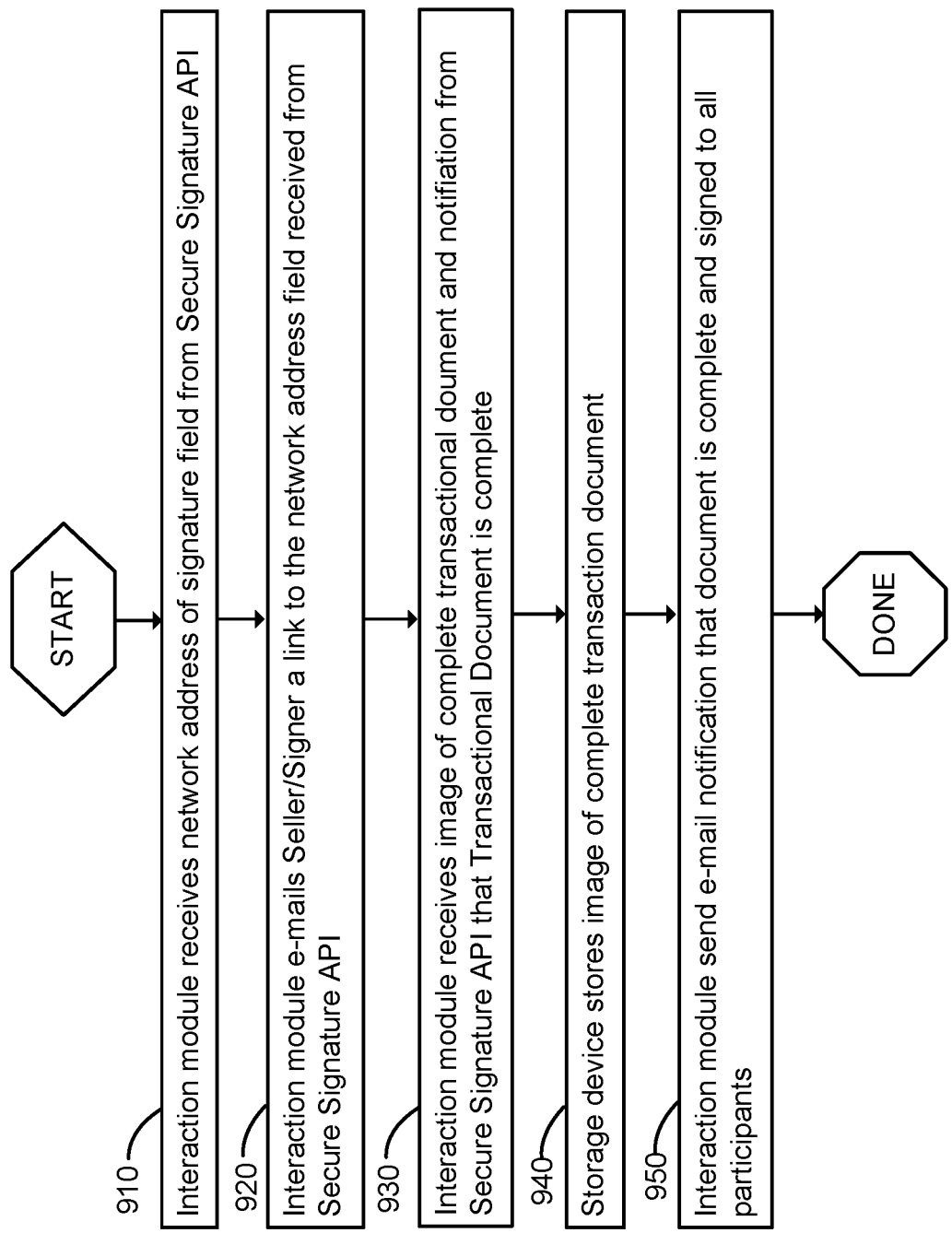
FIG. 9 is a flow diagram of a method for remote signing a transactional document using a computer-implemented online conferencing transactional platform system according to an embodiment of the present disclosure.

FIG. 9 shows a flow diagram of a method for remote signing a transactional document using the computer-implemented online conferencing transactional platform system 210. In a further aspect of the embodiment, at block 910, the interaction module 220 may receive a network address of a signature field 350 of the transactional document within the secure signature API 250. At block 920, the interaction module 220 may e-mail a signer end user 270 or the moderator 240 (this may include a seller or company representative) a link to the network address field for the signature field 350 received from the secure signature API 250. The signer end user 270 or the moderator 240 may provide signature information, such as an identifying image 740, an image of an identity card, a social security number, or a tax identification number into the signature field 350 of the transactional document within the secure signature system 250 via the secure signature API. At block 930, the interaction module 220 may receive images of the complete and signed transactional document and notification from secure signature API 250 that the transactional document is complete. At block 940, the storage device 240 may store the image of the complete and signed transactional document. In a further aspect of the embodiment, at block 950, the interaction module 220 may send an e-mail notification that the transactional document is complete and signed to all participants of the conference.

The blocks in each of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

A computer program product for online conferencing of transactional matters, the computer program product comprising a non-transitory computer readable storage medium having computer readable program code embodied therewith, the computer readable program code being configured to: connect a host terminal to an end user terminal; provide a document for real-time display to the host terminal or the end user terminal; and provide an interaction module for the end user to enter a real-time executed transactional action with the document.

What is claimed is:

1. A computer-implemented method comprising:
   retrieving, using a secure signature application programming interface (API), a secure electronic document and an interactive element, wherein the interactive element is a data input mechanism corresponding to a field of the secure electronic document;
   transmitting, for display, to a signer terminal and a moderator terminal, a webpage comprising the secure electronic document and the interactive element, wherein the interactive element is editable at both the signer terminal and the moderator terminal, enabling the moderator terminal to control navigation of the secure electronic document causing what is displayed at the signer terminal to change as the moderator terminal controls the navigation of the secure electronic document while the signer terminal edits moderator-navigated portions of the secure electronic document, wherein the webpage has a same-origin policy that rejects access to the webpage by another webpage where the another webpage has a different origin from the webpage;
   receiving, based on user input with respect to the interactive element, information for the secure electronic document, wherein the receiving causes the secure electronic document to be filled out with the information;
   generating, using the secure signature API, an inline frame (i-frame) embedded inside an HTML document on the webpage, the i-frame comprising the filled out secure electronic document with one or more empty signature blocks, wherein the HTML document is populated from a source separate from the secure electronic document to prevent the webpage from obtaining access to sensitive data within the secure electronic document, and wherein the i-frame enables the secure signature API to embed the HTML document on the webpage notwithstanding the same-origin policy; and
   transmitting, for display, the i-frame to the signer terminal.

2. The computer-implemented method of claim 1, further comprising:
   responsive to receiving a command from the moderator terminal, allocating control of the webpage to the signer terminal during an online conference.

3. The computer-implemented method of claim 1, wherein transmitting the webpage occurs responsive to establishing a network connection between the secure signature API and the moderator terminal, and wherein the webpage transmitted to the moderator terminal includes a video-conference image of a signer at the signer terminal.

4. The computer-implemented method of claim 1, wherein transmitting the webpage occurs responsive to establishing a network connection between the secure signature API and the signer terminal, and wherein the webpage transmitted to the signer terminal includes a video-conference image of a moderator at the moderator terminal.

5. The computer-implemented method of claim 1, wherein the interactive element comprises at least one of: a radio button, a check box, and a text field.

6. The computer-implemented method of claim 1, further comprising:
   receiving, from the signer terminal, signature information entered to at least one of the one or more empty signature blocks, the signature information comprising one or more of an identifying image, an image of an identification document, and an identification number.

7. The computer-implemented method of claim 1, further comprising:
   responsive to receiving the signature information from the signer terminal, sending a notification to the moderator terminal that the secure electronic document was signed by a signer that is operating the signer terminal.

8. A non-transitory computer-readable storage medium comprising instructions executable by one or more processors, the instructions, when executed, causing the one or more processors to perform operations, the instructions comprising instructions to:
   retrieve, using a secure signature application programming interface (API), a secure electronic document and an interactive element, wherein the interactive element is a data input mechanism corresponding to a field of the secure electronic document;
   transmit, for display, to a signer terminal and a moderator terminal, a webpage comprising the secure electronic document and the interactive element, wherein the interactive element is editable at both the signer terminal and the moderator terminal, enabling the moderator terminal to control navigation of the secure electronic document causing what is displayed at the signer terminal to change as the moderator terminal controls the navigation of the secure electronic document while the signer terminal edits moderator-navigated portions of the secure electronic document, wherein the webpage has a same-origin policy that rejects access to the webpage by another webpage where the another webpage has a different origin from the webpage;
   receive, based on user input with respect to the interactive element, information for the secure electronic document, wherein the receiving causes the secure electronic document to be filled out with the information;
   generate, using the secure signature API, an i-frame embedded inside an HTML document on the webpage, the i-frame comprising the filled out secure electronic document with one or more empty signature blocks, wherein the HTML document is populated from a source separate from the secure electronic document to prevent the webpage from obtaining access to sensitive data within the secure electronic document, and wherein the i-frame enables the secure signature API to embed the HTML document on the webpage notwithstanding the same-origin policy; and
   transmit, for display, the i-frame to the signer terminal.

9. The non-transitory computer-readable storage medium of claim 8, wherein the instructions further comprise instructions to:
   responsive to receiving a command from the moderator terminal, allocate control of the webpage to the signer terminal during an online conference.

10. The non-transitory computer-readable storage medium of claim 8, wherein transmitting the webpage occurs responsive to establishing a network connection between the secure signature API and the moderator terminal, and wherein the webpage transmitted to the moderator terminal further includes a video-conference image of a signer at the signer terminal.

11. The non-transitory computer-readable storage medium of claim 8, wherein transmitting the webpage occurs responsive to establishing a network connection between the secure signature API and the signer terminal, and wherein the webpage transmitted to the signer terminal further includes a video-conference image of a moderator at the moderator terminal.

12. The non-transitory computer-readable storage medium of claim 8, wherein the interactive element comprises at least one of: a radio button, a check box, and a text field.

13. The non-transitory computer-readable storage medium of claim 8, wherein the instructions further comprise instructions to:
receive, from the signer terminal, signature information entered to at least one of the one or more empty signature blocks, the signature information comprising one or more of an identifying image, an image of an identification document, and an identification number.

14. The non-transitory computer-readable storage medium of claim 8, wherein the instructions further comprise instructions to:
responsive to receiving the signature information from the signer terminal, send a notification to the moderator terminal that the secure electronic document was signed by a signer that is operating the signer terminal.

15. A system comprising:
a non-transitory computer-readable storage medium comprising memory with instructions encoded thereon; and
one or more processors that, when executing the instructions, perform operations comprising:
retrieving, using a secure signature application programming interface (API), a secure electronic document and an interactive element, wherein the interactive element is a data input mechanism corresponding to a field of the secure electronic document;
transmitting, for display, to a signer terminal and a moderator terminal, a webpage comprising the secure electronic document and the interactive element, wherein the interactive element is editable at both the signer terminal and the moderator terminal, enabling the moderator terminal to control navigation of the secure electronic document causing what is displayed at the signer terminal to change as the moderator terminal controls the navigation of the secure electronic document while the signer terminal edits moderator-navigated portions of the secure electronic document, wherein the webpage has a same-origin policy that rejects access to the webpage by another webpage where the another webpage has a different origin from the webpage;
receiving, based on user input with respect to the interactive element, information for the secure electronic document, wherein the receiving causes the secure electronic document to be filled out with the information;
generating, using the secure signature API, an i-frame embedded inside an HTML document on the webpage, the i-frame comprising the filled out secure electronic document with one or more empty signature blocks, wherein the HTML document is populated from a source separate from the secure electronic document to prevent the webpage from obtaining access to sensitive data within the secure electronic document, and wherein the i-frame enables the secure signature API to embed the HTML document on the webpage notwithstanding the same-origin policy; and
transmitting, for display, the i-frame to the signer terminal.

16. The system of claim 15, the operations further comprising:
responsive to receiving a command from the moderator terminal, allocating control of the webpage to the signer terminal during an online conference.

17. The system of claim 15, wherein transmitting the webpage occurs responsive to establishing a network connection between the secure signature API and the moderator terminal, and wherein the webpage transmitted to the moderator terminal further includes a video-conference image of a signer at the signer terminal.

18. The system of claim 15, wherein transmitting the webpage occurs responsive to establishing a network connection between the secure signature API and the signer terminal, and wherein the webpage transmitted to the signer terminal further includes a video-conference image of a moderator at the moderator terminal.

19. The system of claim 15, wherein the interactive element comprises at least one of: a radio button, a check box, or a text field.

20. The system of claim 15, the operations further comprising:
receiving, from the signer terminal, signature information entered to at least one of the one or more empty signature blocks, the signature information comprising one or more of an identifying image, an image of an identification document, and an identification number.

* * * * *